(12) United States Patent
Fleming

(10) Patent No.: US 6,449,766 B1
(45) Date of Patent: Sep. 10, 2002

(54) SYSTEM AND METHOD FOR CONSOLIDATING TELEVISION RATING SYSTEMS

(75) Inventor: Michael K. Fleming, Seattle, WA (US)

(73) Assignee: WebTV Networks, Inc., Mountain View, CA (US)

(*) Notice: Subject to any disclaimer, the term of this patent is extended or adjusted under 35 U.S.C. 154(b) by 0 days.

(21) Appl. No.: 09/471,750

(22) Filed: Dec. 23, 1999

(51) Int. Cl.[7] .................................................. H04N 7/16
(52) U.S. Cl. .............................. 725/28; 725/25; 725/31
(58) Field of Search ........................... 725/28, 51, 59, 725/25, 26, 27, 29–31

(56) References Cited

U.S. PATENT DOCUMENTS

| | | | | |
|---|---|---|---|---|
| 5,485,518 A | * | 1/1996 | Hunter et al. ............... 380/20 |
| 5,550,575 A | * | 8/1996 | West et al. ................. 348/5.5 |
| 5,678,041 A | * | 10/1997 | Baker et al. ................ 395/609 |
| 5,691,972 A | * | 11/1997 | Tsuga et al. ............... 369/275.3 |
| 5,912,696 A | * | 6/1999 | Buehl ....................... 348/5.5 |
| 5,973,683 A | * | 10/1999 | Cragun et al. .............. 345/327 |
| 5,995,133 A | * | 11/1999 | Kim ......................... 345/5.5 |

* cited by examiner

Primary Examiner—Andrew Faile
Assistant Examiner—Ngoc Vu
(74) Attorney, Agent, or Firm—Workman, Nydegger & Seeley

(57) ABSTRACT

A multimedia system is described that is capable of recognizing and performing functions based on an) number of rating systems such as the MPAA rating system or the U.S. television rating system. Specifically, the multimedia system stores a data structure representing information regarding each of the ratings in each of the rating systems. Once the rating of a multimedia program is determined, the multimedia system can use this information to perform functions such as providing to the user the information for education purposes, or such as blocking the program.

18 Claims, 5 Drawing Sheets

SYSTEM AND METHOD FOR CONSOLIDATING TELEVISION RATING SYSTEMS

BACKGROUND OF THE INVENTION

1. The Field of the Invention

The present invention relates to electrical computers and data processing systems. Specifically, the present invention relates to a system and method for consolidating television rating systems.

2. The Prior State of the Art

There are dozens of rating systems designed to give information about the content of a particular video segment such as a movie or television program.

Originally, rating systems were applied to movies only, and not television programs. The United States motion picture industry currently uses the Motion Picture Association of America (MPAA) rating system. The MPAA rating system includes ratings that are essentially age-based and are familiar to individuals who view American-made movies. The MPAA ratings include the following:

| Rating | Meaning |
| --- | --- |
| G | General audience - all ages admitted |
| PG | Parental Guidance suggested - some material may not be suitable for children |
| PG-13 | Parents strongly cautioned - some material may be inappropriate for children under 13 |
| R | Restricted - under 17 requires accompanying parent or adult guardian |
| NC-17 | No one 17 or under admitted |

Recently, television programs have incorporated rating systems as well. In 1997, the United States television industry began to use a voluntary television rating system (hereinafter "the U.S. TV rating system") designed to help parents determine the appropriateness of a television program for their children. This U.S. TV rating system includes a dimension that is essentially age-based, and a dimension that is essentially content-based. The age-based dimension of the ratings is listed first in each rating and includes the following:

| Age-Dimension | Meaning |
| --- | --- |
| TV-Y | All Children |
| TV-Y7 | Directed to Older children (e.g., age 7 and above) |
| TV-G | General audience - Most parents would find suitable for all ages |
| TV-PG | Parental Guidance Suggested - Parents may find some material unsuitable for younger children |
| TV-14 | Parents Strongly Cautioned - Parents would find some material inappropriate for children under age 14 |
| TV-MA | Mature Audience - Some material may be inappropriate for children under 17 |

In addition to the above age-based dimension, the U.S. TV rating system also has a content-based dimension. For example, the program having the age-based dimension TV-Y7 may also include Fantasy Violence (FV) so that the rating is TV-Y7-FV. Programs having age-based dimension TV-PG, TV-14 or TV-MA may include content-based dimensions such as violence (V), sexual situations (S), language (L), and/or dialogue (D). Programs having age-based dimensions TV-Y and TV-G do not have content-based dimensions. For example, a rating of TV-PG-V indicates that the age-based rating is "TV-PG" and that there is some violence in the program.

Since the U.S. TV rating system is voluntary, television networks are free to pick and choose which aspects of the U.S. TV rating system to adopt, or whether to ignore the U.S. TV rating system altogether by adopting their own rating system, or by not having a rating system. Some networks may, for example, choose to adopt the age-based dimension of the U.S. TV rating system, but not the content-based dimension. Even those networks that adopt both the age-based and content-based dimensions may choose to represent ratings in different ways. For example, one television network might choose to represent a TV-14 program that has violence and sexual content as "TV-14; V, S" while another represents it as "TV-14, V, S". Note the comma "," instead of the semicolon ";". While this difference may seem trivial, a comma "," character and a semicolon ";" character are quite different when computer-represented in binary so that a computer that recognizes the "TV-14; V, S" rating may not necessarily recognize the "TV-14, V, S" rating.

Television rating systems may also differ geographically. For example, Australia Seand Canada each have different television rating systems than the U.S. TV rating system. Furthermore, new rating systems may be promulgated and old rating systems may become obsolete.

Many people find it difficult to understand or remember what ratings mean even within a common rating system. This difficulty frustrates the television rating system's purpose of conveying information about the television program. For example, a parent may not be properly informed of the appropriateness of a television program for a child if the parent does not understand the rating displayed in the corner of the television screen. The confusion associated with ratings is further compounded when multiple television rating systems are utilized in television programs.

Furthermore, a parent may have a limits provider associated with a television. This limits provider typically blocks programs of certain ratings as designated by a parent. If television programs of a variety of different rating systems are available at the television, the number of possible ratings may be so great that a parent may not know to block all ratings that the parent would like to block. This may result in the viewing of television programs that the parent deems inappropriate.

In light of this confusion, what is desired is a system and method for clearly representing ratings associated with multiple rating systems in a user-friendly, consolidated manner.

SUMMARY OF THE INVENTION

A system and method are described in the context of a multimedia system that has access to multimedia programs such as television programs and/or Web pages. These multimedia programs may include a wide variety of rating systems such as the Motion Picture Association of America (MPAA) rating system, the U.S television rating system. and other rating systems. Each of these rating systems often includes a number of ratings. For example, the MPAA rating system includes the following well-known ratings: G, PG, PG-13, R, and NC-17.

Each of the ratings in each of the rating systems is stored in an organized fashion within a data structure. This data structure is stored in memory accessible by the multimedia system. Once a multimedia program is identified, the rating associated with the multimedia program is also identified. For example, an Electronic Program Guide (EPG) may identify a television program with an associated rating field. The multimedia system would identify the rating within the data structure, and perform a function based on this rating. For example, the multimedia system might provide more information regarding the rating to the user, or perhaps block the program from being viewed.

Since there are numerous rating systems employed throughout the world, a user could get confused about the meaning of a particular rating based on the limited information immediately available to the user. The system and method of the present invention allow for more detailed information regarding each rating of each rating system to be stored locally for immediate access should the user need such information. Furthermore, the system and method allows for computer assisted functions such as program blocking to be available for all ratings. Therefore, the present invention provides a more flexible system and method for computer recognizing multiple rating systems.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
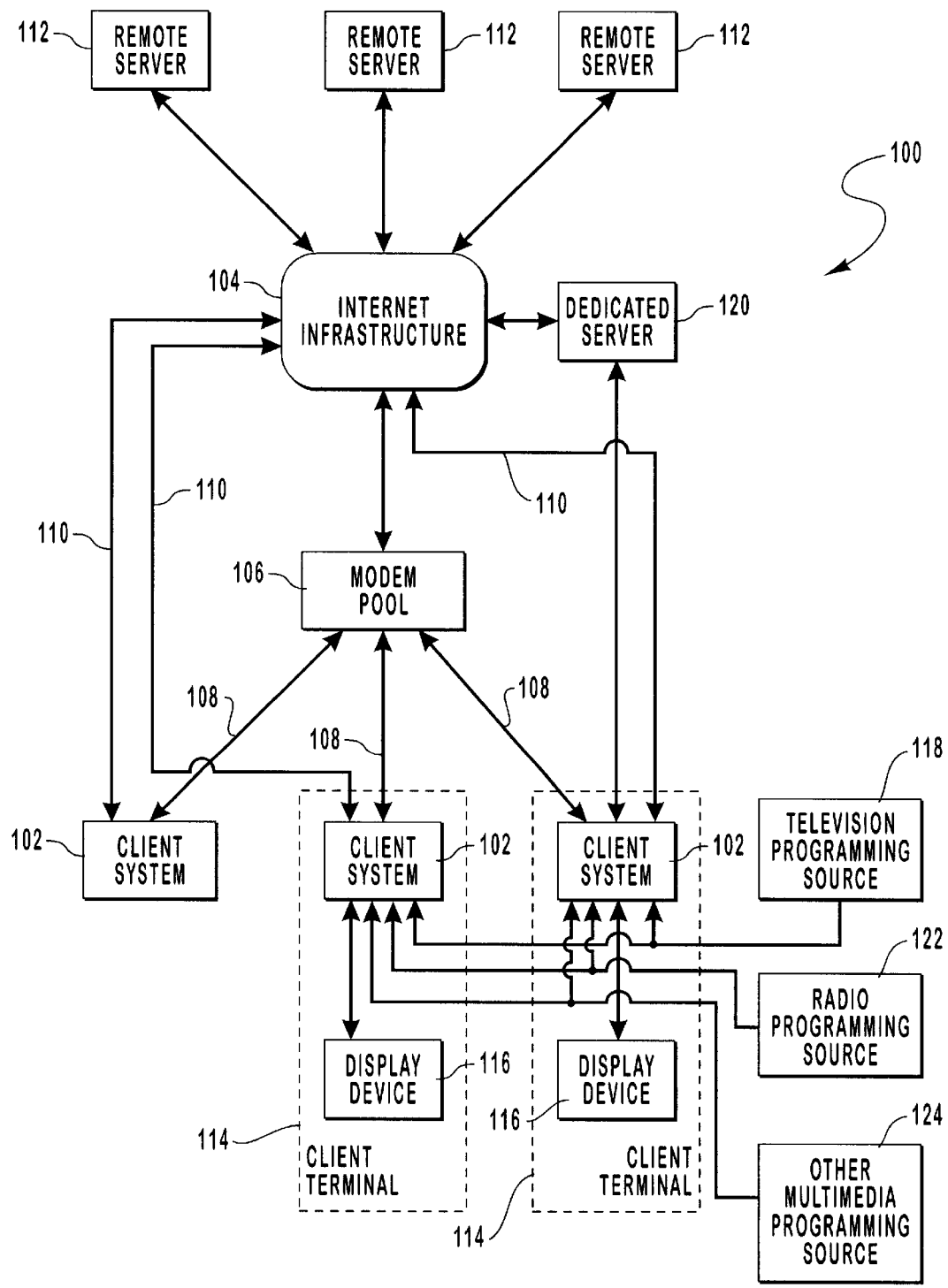
FIG. 1 schematically illustrates a suitable operating environment for the present invention.

In accordance with the present invention, a multimedia system is described that is capable of storing ratings from a number of different rating systems in a consolidated manner. The described multimedia system also represents the appropriate ratings of each of these rating systems to the parent or other user in a user-friendly and easy to understand manner. For example, if a television program or Web page has a certain rating, a description of that rating may be displayed to the parent to help the parent determine whether viewing the program or page is appropriate or not. The parent may have access to more information regarding the rating if requested. This allows the parent to determine the appropriateness of television programs, Web pages, or other multimedia segments.

The invention is described below by using diagrams to illustrate either the structure or processing of embodiments used to implement the systems and methods of the present invention. Using the diagrams in this manner to present the invention should not be construed as limiting of its scope. The embodiments of the present invention may comprise a special purpose or general purpose computer including various computer hardware, as discussed in greater detail below. The embodiments may further comprise multiple computers linked in a network environment.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Although not required, the invention will be described is the general context of computer-executable instructions, such as program modules, being executed by a personal computer. Generally, program modules include routines, programs, objects, components, data structures, etc. that perform particular tasks or implement particular abstract data types. The invention will also be described by making reference to documents, which generally include or are defined by encoded data structures stored in a computer-readable medium or a computer memory device. The encoded data structures of documents often represent words, numbers, or other expression and generally may be generated, edited, displayed and/or stored using a computer.

In one embodiment, the invention is used in a system known as WebTV®, manufactured by WebTV Networks, Inc., of Mountain View, Calif., which uses a conventional television screen or another display unit in combination with a networked computer for composing, sending and receiving e-mail, browsing the World Wide Web (Web), accessing other segments of the Internet, and otherwise displaying information. A WebTV® system uses standard telephone lines, Integrated Services Digital Network (ISDN) lines, cable lines associated with cable television service, or the like to connect to the Internet or other wide area networks.

FIG. 1 illustrates a network architecture 100 that represents a suitable operating environment for the present invention. For clarity, element numbers for an element begin with number corresponding to the figure that introduces the element. For example, the element number for the network architecture 100 begins with a "1" because the network architecture 100 is introduced in FIG. 1.

In this embodiment, multiple multimedia systems such as client systems 102 connect to the Internet infrastructure 104 via a modem pool 106. The multiple client systems 102 connect to the modem pool 106 by means of direct-dial, bi-directional data connections 108. The data connections 108 may be, for example, conventional telephone lines, an Integrated Services Digital Network (ISDN) connection, or other similar direct-dial connections. Modem pool 106 may be any modem pool such as those that are currently used for access to the Internet and other wide area networks. For example, the modem pool 106 may be provided by a local Internet Service Provider (ISP).

Alternatively one or more of the multiple client systems 102 do not use modem pool 106 to connect to the Internet infrastructure 104. Instead, the multiple client systems 102 may have a direct bi-directional data connection 110 to the Internet infrastructure 104. The direct connection 110 may be a dedicated line such as a T1, T2, or T3 connection, or may be a cable connection provided by a cable provider.

The Internet infrastructure 104 is connected to a number of remote servers 112. Thus, the client system 102 may be connected to the remote servers 112 via the Internet infrastructure 104 using the modem pool 106 or direct connections 110.

The systems and methods of consolidating television rating systems can be practiced in network environments that combine information retrieval over the Internet infrastructure 104 with television viewing. As seen in FIG. 1, at least some of the client systems 102 can be associated with display devices 116 to form client terminals such as client terminals 114.

These display devices 116 serve a dual function. First, display devices 116 display graphical computer-generated or computer-transmitted information provided by the associated client systems 102. Web pages retrieved from the remote servers 112 are one example of graphical information that may be displayed on display devices 116.

Second, display devices 116 may also display television programming transmitted from a television programming source 118 to the client systems 102. The television programming source 118 may be any television broadcaster or delivery system. Accordingly, display device 116 may be a conventional television or may instead be a computer monitor adapted to display television programming. Indeed, the client system 102 is optionally integrated within a television, or instead may be a self-contained unit. It is anticipated that, as high definition television ("HDTV") and other forms of digital television become common, embodiments of the client terminal 114 will support HDTV and other forms of digital television.

In addition, the client terminals 114 may also support the reception of multimedia segments other than television programming and Web pages. For example, the clients terminals 114 may receive and sound radio signals received over the Internet infrastructure 104 or from a radio programming source 122. In addition, the client terminals 114 may also receive other multimedia segments from other multimedia programming sources 124.

Optionally, the network architecture 100 of FIG. 1 can include a dedicated server 120 that is dedicated to providing Internet access to some or all of client systems 102. In this example, dedicated server 120 differs from modem pool 106 in that the dedicated server 120 is adapted to support a particular type of client system 102 in contrast to serving any personal computer or other computing device that can access the Internet infrastructure 104. Furthermore, dedicated server 120 optionally provides additional information services, such as television listings, enhanced television services, video or graphics delivery, and so forth.

Figure 2:
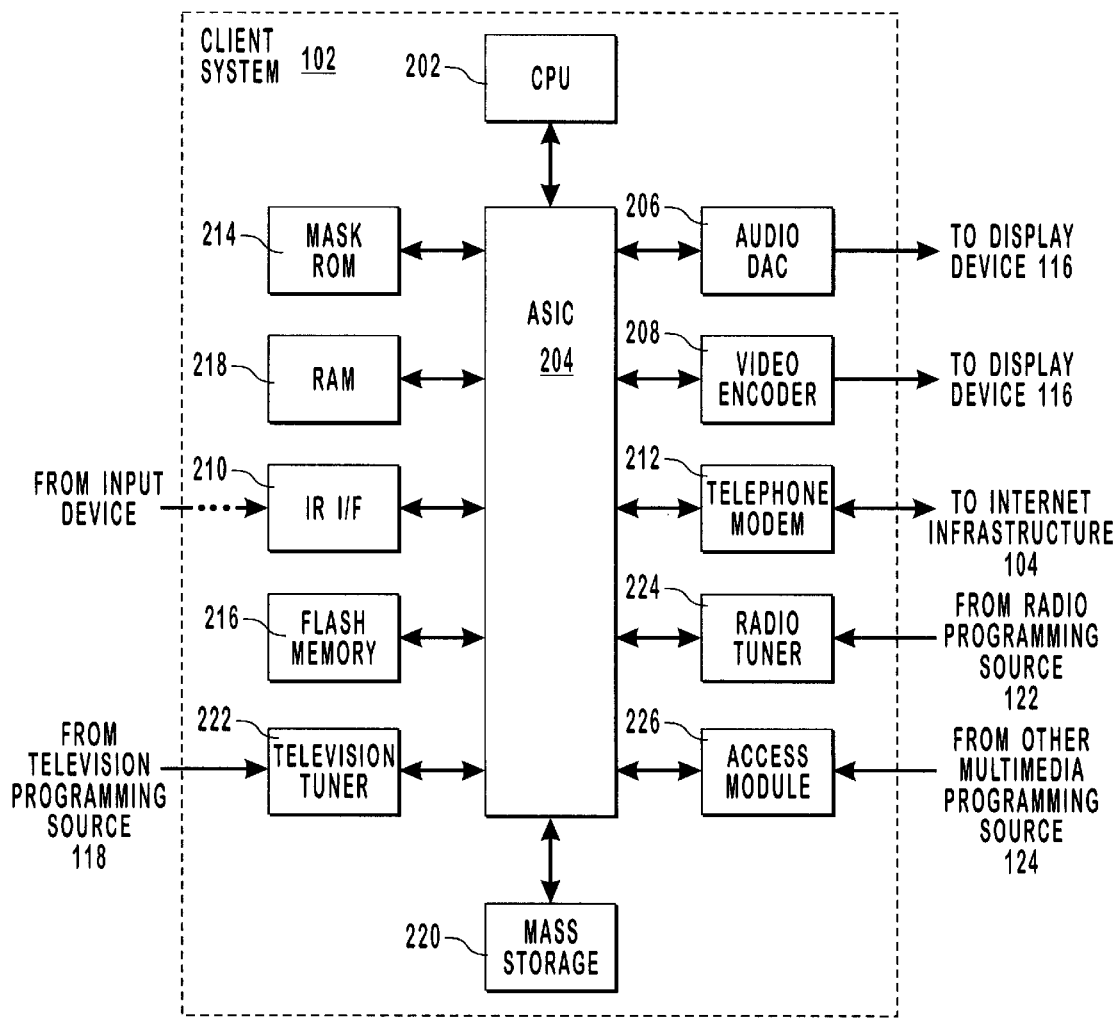
FIG. 2 schematically illustrates the internal hardware features of the client system of FIG. 1.

FIG. 2 depicts selected hardware elements of one embodiment of a client system 102 that may be used to implement portions of the invention. Client system 102 uses hardware and computer-executable instructions for providing the user with a graphical user interface, by which the user can access television program, Internet resources, and optionally receive other information services such as radio programming. Operation of client system 102 is controlled by a central processing unit (CPU) 202, which is coupled to an application-specific integrated circuit (ASIC) 204. CPU 202 executes computer program code means including computer-executable instructions designed to implement features of client system 102, including some of the steps and acts of methods of the present invention. Individual acts of the present invention may be represented by individual computer-executable instructions or a group of computer-executable instructions. ASIC 204 contains circuitry which is used to implement certain functions of client system 102. For example, ASIC 204 may be coupled to an audio digital-to-analog converter 206 and to a video encoder 208, which provide audio and video output, respectively, to the display device 116 of FIG. 1.

Client system 102 may further include an IR interface 210 for detecting infrared signals transmitted by a remote control input device, such as a hand-held device or a wireless keyboard. In response to the infrared signals, IR interface 210 provides corresponding electrical signals to ASIC 204. A modem 212 is coupled to ASIC 204 to provide connections to modem pool 106 and, via the Internet infrastructure 104, to remote servers 112. The modem 212 may be one modem or a group of modems. For example, the modem 212 may represent one or more of a telephone modem, an ISDN modem, a cable modem, or any other suitable communications device. Any of these devices is sufficient to support the communications of the client system 102 over the Internet infrastructure 104. In other environments, communication may instead be established over the Internet infrastructure 104 using a token ring or Ethernet connection.

Also coupled to ASIC 204 are a mask read-only memory (ROM) 214, a flash memory 216, and a random access memory (RAM) 218. Mask ROM 214 is non-programmable and provides storage of computer-executable instructions and data structures. Flash memory 216 may be a conventional flash memory device that can be programmed and erased electronically. Flash memory 216 may store Internet browser software as well as data structures. In one embodiment, a mass storage device 220 coupled to ASIC 204 is included in client system 102. Mass storage device 220 may be used to supply computer-executable instructions and data structures to other components of the client system 102 or to receive data downloaded over the network. Mass storage device 220 may include any suitable medium for storing computer-executable instructions, such as magnetic disks, optical disks, and the like.

Application software and associated operating system software are stored in flash memory 216, or instead may be stored in any other suitable memory device, such as mask ROM 214, RAM 218 or mass storage device 220. The computer-executable instructions that are used to control access to multimedia services are executed by CPU 202. In particular, CPU 202 executes sequences of instructions contained in one or more of mask ROM 214, flash memory 216, RAM 218, and mass storage device 220 to perform certain steps of the present invention that will be more specifically disclosed hereinafter.

The client system 102 also includes a television tuner 222 for tuning to television programs received from the television programming source 118. The tuner 222 may be one or more of the following tuner types: a Very High Frequency (VHF) tuner, an Ultra High Frequency (UHF) tuner, a Digital Video Broadcast Satellite (DVB-S) tuner, a Digital Video Broadcast Terrestrial (DVB-T) tuner, a digital American Television Standards Committee (ATSC) tuner, or any other tuner suitable for receiving multimedia data such as audio and/or video data. The tuner 222 is controlled directly by the ASIC 204, and indirectly by a user using a control device such as a remote control.

Optionally, the client system 102 may also have a radio tuner for tuning to radio programming from the radio programming source 122, or other access modules 226 for accessing data or other multimedia programming from other multimedia programming sources 124. In this description and in the claims, a "multimedia program" is defined as any data segment that can be displayed and/or sounded including, but not limited to, television programs, movies, Web pages, songs, and so forth.

In one embodiment of the invention, client system 102 is a WebTV® set-top box manufactured by WebTV Networks, Inc. of Mountain View, Calif. In this case, dedicated server 120 of FIG. 1 can be a WebTV® server that provides Internet access and, optionally, additional content and information. Alternatively, however, client system 102 may be any of a variety of systems for receiving resources from a server.

Those skilled in the art will appreciate that the invention is not limited to the distributed computing environment and the client system illustrated in FIGS. 1 and 2. The invention may be practiced using other client system configurations, including personal computers, hand-held devices, multi-processor systems, microprocessor-based or programmable consumer electronics, network PCs, minicomputers, mainframe computers, and the like. In distributed computing environments, program modules may be located in both local and remote memory storage devices.

Each multimedia program received by the client system 102 may be accompanied by a rating that indicates information about the associated multimedia program. Each rating generally belongs to a rating system which may include a plurality of ratings. For example, if the multimedia program is a movie played from a video cassette recorder or a DVD player, the rating may be part of the MPAA rating system which includes ratings such as "G", "PG", "PG-13", "R", or "NC-17". If the multimedia program is a television program, the rating may be part of the U.S. TV rating system which typically includes an age-based dimension such as "TV-Y", "TV-Y7", "TV-G", "TV-PG", "TV-14", and "TV-MA" as well as possibly one or more content-based dimensions such as "FV" for Fantasy Violence, "V" for Violence, "S" for Sexual content, "L" for coarse Language, and "D" for suggestive Dialogue. The television program may also include a rating of a variation of this U.S. TV rating system. For example, the rating may include only the age-based dimension, but never any content-based dimensions.

It is also contemplated by the inventor of the claimed invention that one or more standardized rating systems may be developed to advise on the content of Web pages and other information download able from one or more of the remote servers 112 over the Internet infrastructure 104. It is intended that the present invention may also receive Web pages having these Internet rating systems as well. In addition, the radio programs received from the radio programming source 122 and the other multimedia programs received from the other multimedia programming sources 124 may also contain accompanying ratings. The rating systems utilized will often vary geographically and over time.

Thus, the client terminal 114 may encounter multimedia programs having a variety of different rating systems. The client terminal 114 recognizes ratings of many rating systems so as to perform predetermined functions such as program blocking based on the recognized rating.

Figure 5:
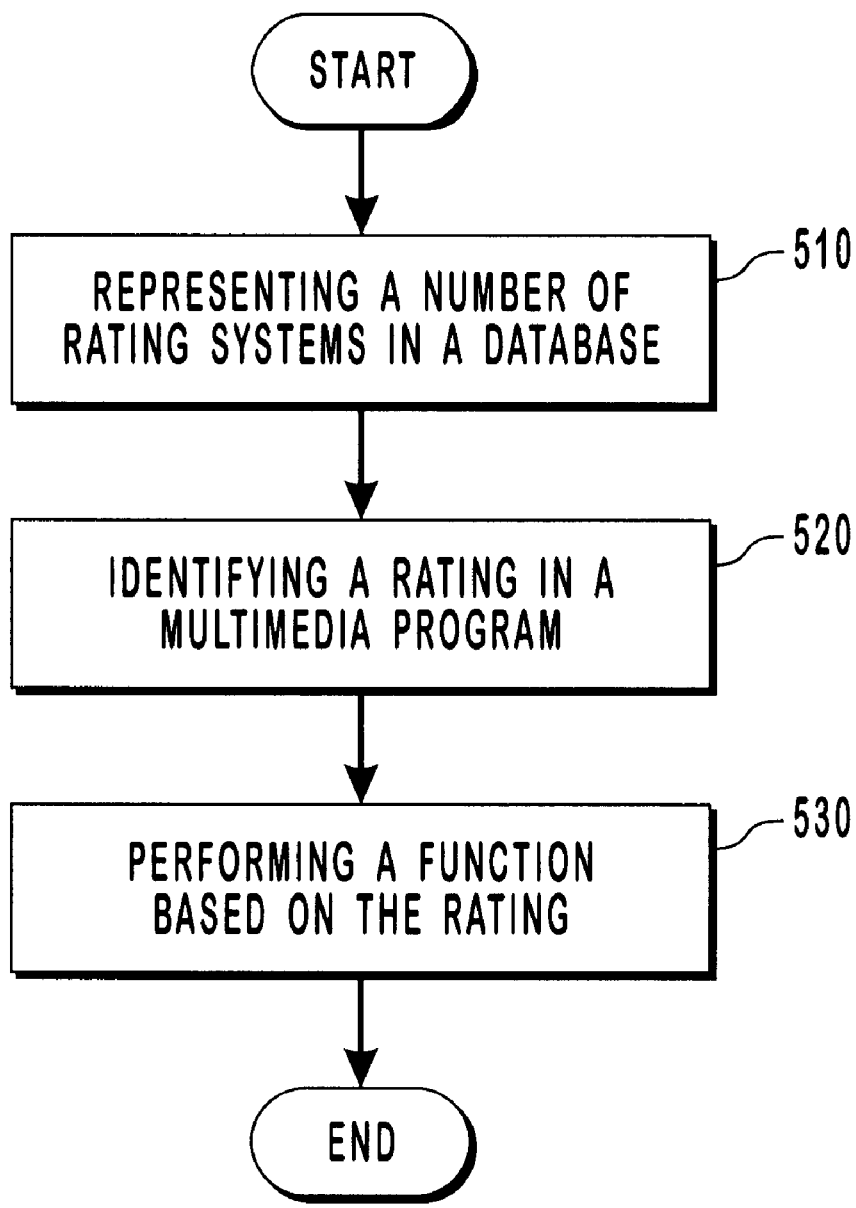
FIG. 5 illustrates a flowchart for representing, identifying, and using the plurality of rating systems.

To this end, the client system 102 stores ratings of a number of different rating systems (step 510 or FIG. 5). Accordingly, embodiments within the scope of the present invention include a means or step for representing each of the plurality of ratings of each of the plurality of rating systems in a data structure stored in a memory. This data structure is represented by the data structure 300 of FIG. 3.

Figure 3:
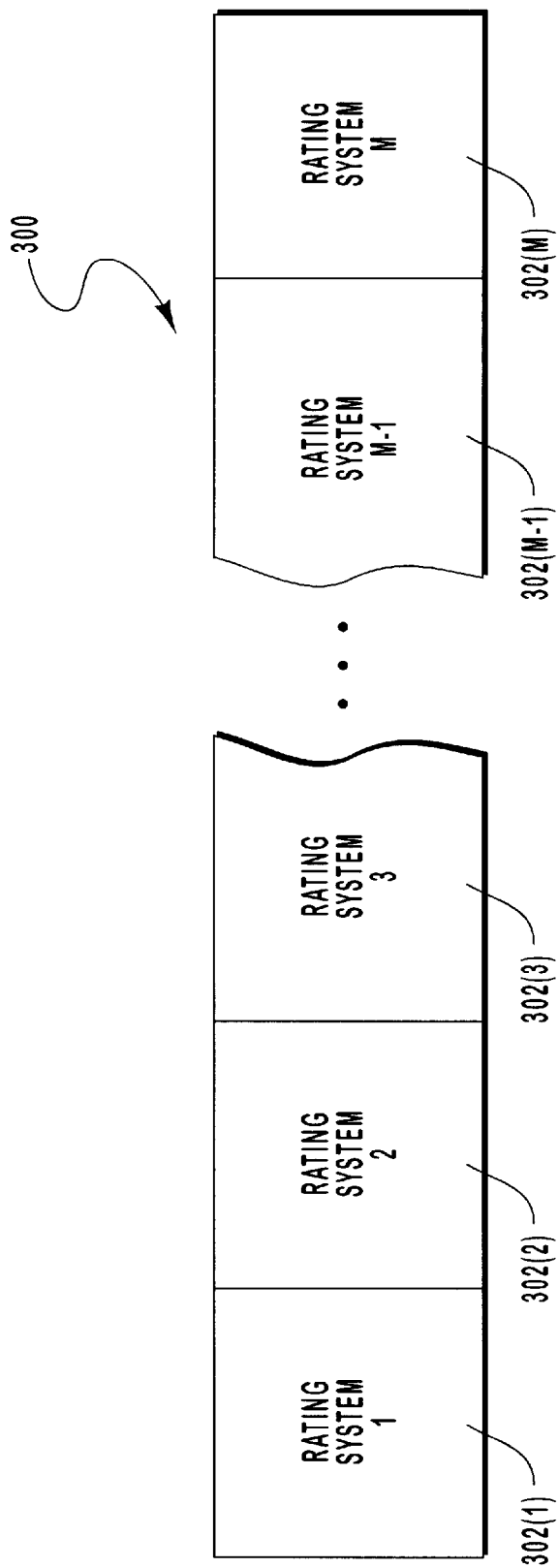
FIG. 3 illustrates a data structure for storing a plurality of rating systems which may be stored in the memory of the client system of FIG. 2.

Data structure 300 includes a consolidation of a number (M) of rating systems labeled 302(1) to 302(M) that may be received by the client terminal 114. For clarity, only rating systems 302(1), 302(2), 302(3), 302(M–1) and 302(M) are shown in FIG. 3. old rating system becomes obsolete, that rating system may be removed from the data structure 300. As a new rating system is detected by the client terminal 114, that rating system may be added to the data structure 300. Thus, the data structure 300 may be kept current of many, if not all, of the rating systems used by multimedia programs that the client terminal 114 may receive.

Each rating system 302(1) to 302(M) has a short identifier such as an integer value associated with the rating system. This identifier is local to the client system 102 in that components within the client system 102 recognize the identifier as corresponding to a particular rating system. However, the identifier is not world global in that components and systems outside of the client system 102 do not likely recognize the identifier as corresponding to the particular rating system. The local identifier is also persistent in that it does not change at least over the short term. Thus, the client system 102 can reasonably rely on the identifier remaining the same.

The consolidated rating system provides a mapping between this identifier and the hereinafter-described data associated with the rating system. This identifier may be stored in records such as electronic program guide databases in the client system 102 instead of storing the actual data itself in such records. Since the identifier corresponding to a rating system occupies much less memory space than all of the hereinafter-described data corresponding to the rating system, the identifier saves memory space.

Figure 4:
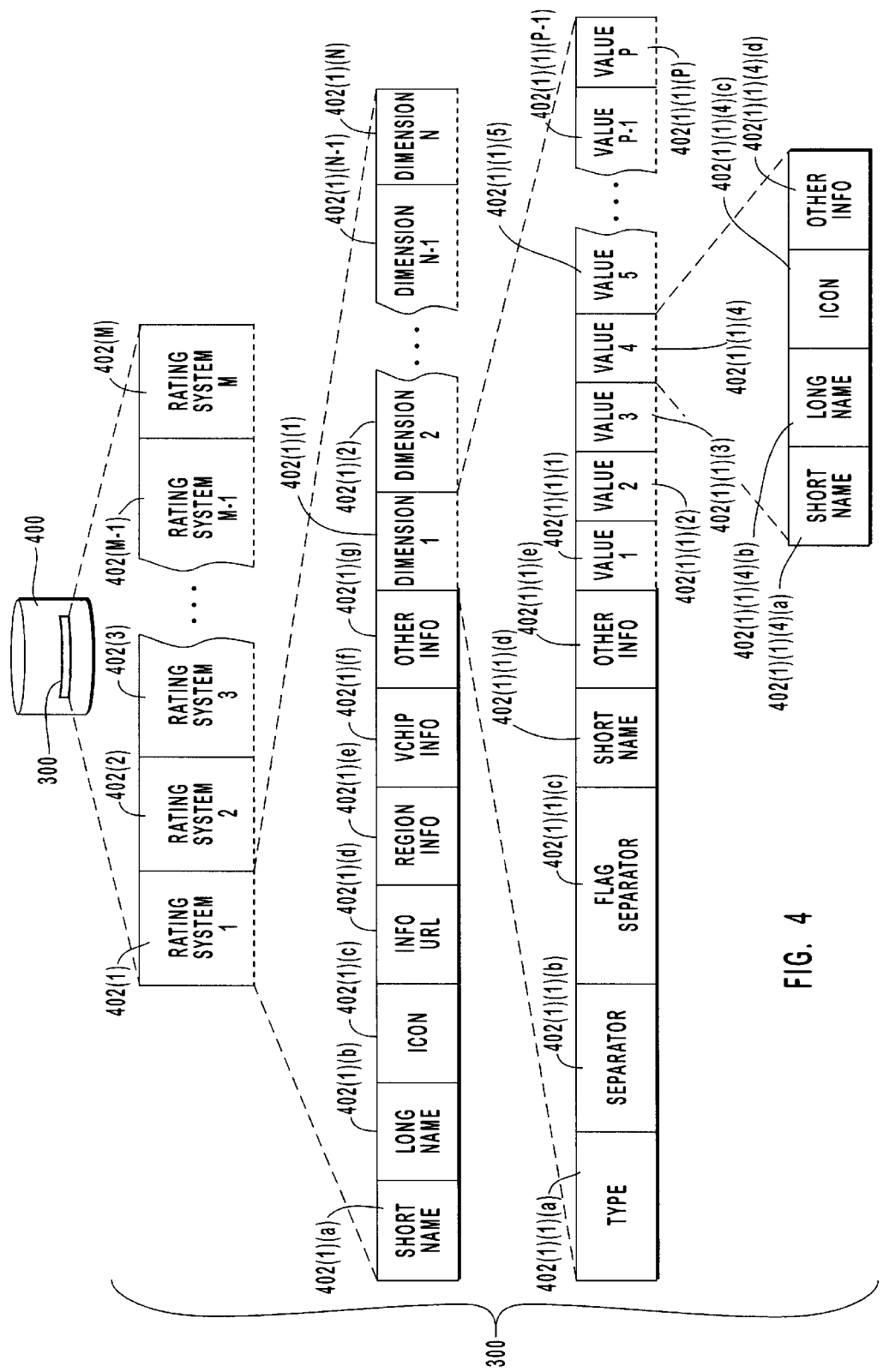
FIG. 4 illustrates a detailed configuration of the data structure of FIG. 3.

FIG. 4 shows the detailed structure of the data structure 300 of FIG. 3. As shown in FIG. 4, the data structure 300 may reside in a memory 400 which may be any sufficiently sized memory device including flash memory 216.

The data structure 300 may be stored as a directory tree in a root directory. The data structure 300 may include a directory for each rating system such as rating system directories 402(1) through 402(M) that correspond to rating systems 302(1) through 302(M). For clarity, the dotted lines on the bottom of blocks 402(1) through 402(M) identify the blocks as directories. Each rating system directory 402(1) through 402(M) contains information related to the corresponding rating system 302(1) through 302(M) and is identified by a corresponding unique identifier such as positive integers 1 through M, respectively. For clarity, only the contents of the rating system directory 402(1) are described. However, the contents of the other rating system directories 402(2) through 402(M) contain similar information as is described for rating system directory 402(1).

Within the rating system directory 402(1) are a number of fields 402(1)(a) to 402(1)(g). For example, Short Name field 402(1)(a) represents a short name of the rating system 302a. "USTV" is an example of a short name that refers to the United States Television rating system. "MPAA" is an example of a short name that refers to the Motion Picture Association of America rating system.

Long Name field 402(1)(b) represents the full name of the rating system 302a. "The United States Television Rating System" is an example of a long name that corresponds to the "USTV" short name. The "Motion Picture Association of America Rating System" is a long name for the "MPAA" short name.

Icon field 402(1)(c) represents an icon graphic that identifies the rating system 302(1). This field may be a graphics file such as a JPG, or Bitmap (BMP) file.

Informal field 402(1)(d) identifies a location where more information can be found describing the rating system 302(1). This location may be a Web page located on one of the remote servers 112, or may be a file system path that is local to the client system 102.

Region field 402(1)(e) represents a region that originated the signal. This field may be, for example, an ATSC region code and/or a DVB region code associated with the rating system 302(1). ATSC and DVB are digital television standards. The DVB region code may include a three-letter ISO 3166 country code or an ETSI ("European Telecommunications Standards Institute") group that DVB associates with the rating system 302(1).

The rating system directory 402(1) may also contain information that is helpful to the client system 102 in performing certain functions. For example, the rating system subdirectory 402(1) may contain a Vchip info field 402(1)(f) for assisting in extracting ratings using a V chip.

The rating system directory 402(1) may also have other information fields 402(1)(g) which may contain any imaginable information concerning the rating system 302(1) that is useful either to the user and/or to the client system 102 in performing its functions.

The rating system directory 402(1) also contains a number (N) of dimension directories 402(1)(1) through 402(1)(N), each containing information regarding a dimension of the rating system. The number (N) of dimension directories 402(1)(1) through 402(1)(N) will be equal to the number of dimensions in the rating system 302(1). For example, if the rating system is the MPAA rating system, there is only one dimension. Thus, if the rating system 302(1) was the MPAA rating system, there would be only one dimension directory 402(1)(1).

On the other hand, the U.S. TV rating system includes six dimensions, one for the age-based dimensions, and one each for the content dimension of "FV" for Fantasy Violence, "V" for violence, "S" for sexual content, "L" for coarse language, and "D" for suggestive Dialogue. Thus, if the rating system 302(1) was the U.S. TV rating system, the rating system directory 402(1) would include six dimension directories 402(1)(1) through 402(1)(6).

Each dimension directory 402(1)(1) through 402(1)(N may include a Type field, a Separator field, a Flag Separator field, a Short Name field, and other fields. For example, age-based dimension directory 402(1)(1) includes a number of fields 402(1)(1)(a) to 402(1)(g). The other dimension directories may 402(1)(2) through 402(1)(N) contain similar fields.

Type field 402(1)(1)(a) indicates whether the dimension is an ordered enumeration of values, an unordered enumeration of values, or a flag. For example, the U.S. TV rating system age-based dimension is an ordered enumeration by age ranging from "TV-Y" to "TV-MA". "V", "S", "L", and "D" are each flag dimensions which are each either on or The dimension directory 402(1)(1) also contains a separator field 402(1)(1)(b) which indicates the character used to separate the dimension from the previous dimension if the previous dimension is not a flag dimension. These characters may be, for example, a comma "," character, a semicolon ";" character, a dash "-" character, and so forth. For example, in the U.S. TV rating variation that includes the rating "TV-PG; V, S, D", the separator is a semicolon ";".

The flag separator field 402(1)(1)(c) indicates the character used to separate the dimension from the previous dimension if the previous dimension is a flag dimension. For example, in the rating "TV-PG; V, S, D", the flag separator is a comma ",".

The short name field 402(1)(1)(d) includes a short name of the dimension. For example, in the U.S. TV rating system, the short name of the dimension associated with the dimension directory 402(1)(1) might be, for example, "age-based". The short name of the dimension associated with the dimension subdirectories 402(1)(2) through 402(1)(6) may be, for example, "FV" for Fantasy Violence, "V" for Violence, "S" for Sexual content, "L" for coarse Language, and "D" for suggestive Dialogue.

The other dimension field 402(1)(1)(e) is for listing other information regarding the dimension that might be useful to either the user and/or the client system 102 such as, for example, the ATSC dimension, or any other desired information.

The dimension subdirectory 402(1)(1) also contains a number (P) of value directories 402(1)(1)(1) through 402(1)(1)(P), each of which representing a value within the dimension. For example, if the rating system 302(1) is the U.S. TV rating system, and the dimension subdirectory 402(1)(1) represents the age-based dimension of the U.S. TV rating system, there would be one directory for each of the values, TV-Y, TV-Y7, TV-G, TV-PG, TV-14, and TV-MA for a total of six different directories 402(1)(1)(1) through 402(1)(1)(6). The fourth value TV-PG of this dimension will be discussed as an example.

Each of the value directories 402(1)(1)(1) through 402(1)(1)(P) stores information regarding the value of the relevant dimension of the relevant rating system. For example, value directory 402(1)(1)(4) stores fields 402(1)(1)(4)(a) through 402(1)(1)(d) and represents, for example, the "TV-PG" value.

Value directory 402(1)(1)(4) includes a short name field 402(1)(1)(4)(a) which includes a short name of the value such as, for example, "TV-PG" meaning that parental guidance is suggested in that parents may find some material in the multimedia program to be unsuitable for younger children.

A long name field 402(1)(1)(4)(b) contains a more descriptive, longer name of the value such as "Parental Guidance Suggested—Parents may find some material unsuitable for younger children" which corresponds to the short name of "TV-PG".

An icon field 402(1)(1)(4)(c) contains a graphics file of an icon that represents the value.

Other information field 402(1)(1)(4)(d) may include information useful to the user or client system 102 for accomplishing its various functions. For example, the other information field 402(1)(1)(4)(d) may include information useful in evaluating DVB or ATSC ratings.

The data structure 300 is dynamic in that rating systems may be removed when obsolete, or added when discovered. Accordingly, embodiments within the scope of the present invention include means and/or step for removing unused rating systems. This means may include the client system 102 deleting the rating system from the data structure 300 if the rating system has not been encountered by the client system 102 for a predetermined time period.

Embodiments of the present invention also include a means and/or step for adding new ratings systems to the data structure 300. This means or step might include the client system 102 reading some or all of the fields associated with a new rating system from the broadcasted or downloaded information itself and then transcribing this information into the data structure. In addition, the means might include the user being prompted to enter the fields. For example, the client terminal 114 might prompt the user using display device 116 to enter information related to a rating.

Once the rating systems are properly represented in the memory 400 (step 510 of FIG. 5), the client system 102 uses this flexible data structure 300 to identifying a rating of certain multimedia programs (step 520 of FIG. 5). Accordingly, embodiments within the scope of the present invention uses means for identifying a rating of a multimedia program. The multimedia program may be, for example, a program selected from an electronic program guide or a program currently being viewed. In either case, rating information may be associated with the program. Thus, the means for identifying the rating of the multimedia program may include the client system 102 extracting the rating from the multimedia program, and reading the associated rating. For example, the rating may be extracted from line 21 of the vertical blanking interval, or may be read from well-known ratings fields present in ATFSC or DVB digital television broadcast, and so forth.

Once the rating is determined (step 520 of FIG. 5), the rating may be used by the client system 102 to perform a function (step 530 of FIG. 5). Accordingly, embodiments within the scope of the present invention include a means and step for performing a function based at least in part on the rating (step 530). The client system 102 may use the rating to perform a variety of different functions.

One function might be to match the rating with the rating stored in the data structure 300. For example, the rating information provided in the multimedia program may include only a short value name for an age-based dimension such as "TV-14" and a short value name for a flag dimension such as "V". From this information the client system 102 searches the database to find these values and determine additional information regarding the rating. For example, the client system 102 could offer the user a long name for the value "TV-14" such as "Parents Strongly Cautioned—Parents would find some material inappropriate for children under age 14." In addition, the user may be offered an address to a resource that contains further information regarding the rating. The additional information obtained from the database 300 may also be used to performing other functions such as program blocking.

The above describes a system and method for computer recognizing a plurality of different rating systems. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a multimedia system that is capable of receiving multimedia programs each having a particular rating system of a plurality of rating systems, wherein each of the plurality of rating systems includes a plurality of ratings, a method of recognizing each of the plurality of ratings in each of the plurality of rating systems notwithstanding that there are multimedia programs of a variety of different rating systems that may be received at the multimedia system, the method comprising the acts of:

prior to receiving a multimedia program at the multimedia system, storing in a memory of the multimedia system a data structure that includes rating system directories, each rating system directory representing one of the plurality of rating systems and including one or more fields containing information relating to the plurality of ratings of the corresponding rating system;

receiving, at the multimedia system, said multimedia program, wherein said multimedia program has a rating that is included in a particular rating system;

upon receiving the multimedia program at the multimedia system, extracting rating information associated with the multimedia program;

searching the data structure using the rating information to identify the rating system directory representing the particular rating system and to identify the rating of the multimedia program; and performing a function based on the identified rating of the multimedia program.

2. The method according to claim 1, wherein the act of storing comprises the acts of:

defining an identifier corresponding to each rating system in the data structure; and mapping the identifier to each corresponding rating system in the data structure.

3. The method according to claim 1, wherein the act of storing comprises the act of the multimedia system storing ratings of the MPAA television rating system in the memory.

4. The method according to claim 1, wherein the act of storing comprises the act of the multimedia system storing ratings of a U.S. television rating system.

5. The method according to claim 1, wherein the act of storing the data structure comprises the act of storing, for each of the plurality of rating systems, information relating to the rating system in a rating system directory named with a unique identifier.

6. The method according to claim 5, wherein the act of storing information relating to the rating system in a rating system directory named with a unique identifier comprises the acts of:

for each of the plurality of rating systems, including a short name of the rating system as part of the information relating to the rating system; and for each of the plurality of rating systems, including a long name of the rating system as part of the information relating to the rating system.

7. The method according to claim 5, wherein the act of storing information relating to the rating system in a rating system directory named with a unique identifier comprises the act of, for each of the plurality of rating systems, including an icon graphic representing the rating system as part of the information relating to the rating system.

8. The method according to claim 5, wherein the act of storing information relating to the rating system in a rating system directory named with a unique identifier comprises the act of, for each of the plurality of rating systems, including a Uniform Resource Locator (URL) that identifies a location where more information can be found regarding the rating system.

9. The method according to claim 5, wherein the act of storing information relating to the rating system in a rating system directory named with a unique identifier comprises the act of storing information describing each of a plurality of dimensions in the rating system.

10. The method according to claim 9, wherein the act of storing information relating to the rating system in a rating system directory named with a unique identifier comprises the act of storing a separator character used in the rating system to separate a dimension from a previous dimension.

11. The method according to claim 1, further comprising the act of removing unused rating systems from the plurality of rating systems represented by the rating system directories included in the data structure.

12. The method according to claim 11, wherein the act of removing unused rating systems from the plurality of rating systems comprises the act of the multimedia system deleting an unused rating system if the multimedia system has not encountered the unused rating system for a predetermined time period.

13. The method according to claim 1, further comprising the act of adding new rating systems to the data structure.

14. The method according to claim 1, wherein the act of performing a function includes the act of blocking the multimedia program.

15. The method according to claim 1, wherein the act of performing a function includes the act of the multimedia system providing to a user more information regarding the rating.

16. A computer program product for implementing, in a multimedia system that is capable of receiving multimedia programs of a plurality of rating systems, wherein each of the plurality of rating systems includes a plurality of ratings, a method of recognizing each of the plurality of ratings in each of the plurality of rating systems notwithstanding that there are multimedia programs of a variety of different rating systems that may be received at the multimedia system, the computer program product comprising:

a computer readable medium carrying computer-executable instructions for implementing the method, including the acts of:
  prior to receiving a multimedia program at the multimedia system, storing in a memory of the multimedia system a data structure that includes rating system directories, each rating system directory representing one of the plurality of rating systems and including one or more fields containing information relating to the plurality of ratings of the corresponding rating system;
  receiving, at the multimedia system, said multimedia program, wherein said multimedia program has a rating that is included in a particular rating system;
  upon receiving the multimedia program at the multimedia system, extracting rating information associated with the multimedia program;
  searching the data structure using the rating information to identify the rating system directory representing the particular rating system and to identify the rating of the multimedia program; and
  performing a function based on the identified rating of the multimedia program.

17. In a multimedia system that is capable of receiving multimedia programs each having a particular rating system of a plurality of rating systems, wherein each of the plurality of rating systems includes a plurality of ratings, a method of recognizing each of the plurality of ratings in each of the plurality of rating systems notwithstanding that there are multimedia programs of a variety of different rating systems that may be received at the multimedia system, the method comprising the acts of:

prior to receiving a multimedia program at the multimedia system, storing a data structure in a memory of the multimedia system, the data structure representing each of the plurality of ratings of each of the plurality of rating systems;

receiving a multimedia program at the multimedia system, wherein the multimedia program has a rating that is included in a particular rating system;

extracting rating information associated with the multimedia program;

searching the data structure using the extracted rating information to identify the rating of the received multimedia program; and based on the identified rating of the multimedia program, determining whether to block the multimedia program from being displayed.

18. A computer program product for implementing, in a multimedia system that is capable of receiving multimedia programs of a plurality of rating systems, wherein each of the plurality of rating systems includes a plurality of ratings, a method of recognizing each of the plurality of ratings in each of the plurality of rating systems notwithstanding that there are multimedia programs of a variety of different rating systems that may be received at the multimedia system, the computer program product comprising:

a computer readable medium carrying computer-executable instructions for implementing the method, including the acts of:
  prior to receiving a multimedia program at the multimedia system, storing a data structure in a memory of the multimedia system, the data structure representing each of the plurality of ratings of each of the plurality of rating systems;
  receiving a multimedia program at the multimedia system, wherein the multimedia program has a rating that is included in a particular rating system;
  extracting rating information associated with the multimedia program;
  searching the data structure using the extracted rating information to identify the rating of the received multimedia program; and
  based on the identified rating of the multimedia program, determining whether to block the multimedia program from being displayed.

* * * * *

UNITED STATES PATENT AND TRADEMARK OFFICE
CERTIFICATE OF CORRECTION

PATENT NO. : 6,449,766 B1
DATED : September 10, 2002
INVENTOR(S) : Michael K. Flemming It is certified that error appears in the above-identified patent and that said Letters Patent is hereby corrected as shown below:

<u>Title page,</u>
Item [57], ABSTRACT,
Line 2, change "an)" to -- any --

<u>Column 2,</u>
Line 23, change "Seand" to -- and --

<u>Column 3,</u>
Line 26, change "becoine" to -- become --

<u>Column 4,</u>
Line 61, after "with" insert -- a --

<u>Column 8,</u>
Line 20, before "old" insert -- As an --
Lines 33-34, change "do not likely" to -- likely do not --

<u>Column 9,</u>
Line 17, change "Informal" to -- InfoURL --
Line 59, after "(N" insert -- ) --
Line 64, after "directories" delete "may"
Line 64, before "contain" insert -- may --

<u>Column 10,</u>
Line 4, after "or" insert -- off --

UNITED STATES PATENT AND TRADEMARK OFFICE
CERTIFICATE OF CORRECTION

PATENT NO.    : 6,449,766 B1
DATED         : September 10, 2002
INVENTOR(S)   : Michael K. Flemming It is certified that error appears in the above-identified patent and that said Letters Patent is hereby corrected as shown below:

<u>Column 11,</u>
Line 21, change "identifying" to -- identify --
Line 34, change "ATFSC" to -- ATSC --
Line 58, change "performing" to -- perform --

Signed and Sealed this

Fifth Day of August, 2003

JAMES E. ROGAN
*Director of the United States Patent and Trademark Office*